(12) United States Patent
Klein et al.

(10) Patent No.: US 10,079,836 B2
(45) Date of Patent: Sep. 18, 2018

(54) METHODS AND SYSTEMS FOR SECURED AUTHENTICATION OF APPLICATIONS ON A NETWORK

(71) Applicant: Broadcom Corporation, Irvine, CA (US)

(72) Inventors: Philippe Klein, Jerusalem (IL); Jacob Mendel, Kibutz Givat Brenner (IL); Shlomo Markel, Haifa (IL)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/018,796

(22) Filed: Feb. 8, 2016

(65) Prior Publication Data

US 2016/0156637 A1    Jun. 2, 2016

Related U.S. Application Data

(63) Continuation of application No. 13/904,426, filed on May 29, 2013, now Pat. No. 9,282,086.

(Continued)

(51) Int. Cl.
*G06F 7/04* (2006.01)
*H04L 29/06* (2006.01)
(Continued)

(52) U.S. Cl.
CPC ............ *H04L 63/105* (2013.01); *H04L 63/08* (2013.01); *H04W 12/06* (2013.01); *H04L 63/107* (2013.01);
(Continued)

(58) Field of Classification Search
CPC .................................................... H04L 63/105
(Continued)

(56) References Cited

U.S. PATENT DOCUMENTS 6,075,863 A    6/2000  Krishnan et al.
8,893,255 B1 * 11/2014 Martini ............... H04L 63/0884
                                                        709/238

(Continued)

FOREIGN PATENT DOCUMENTS

| CN | 101582769 A | 11/2009 |
|----|-------------|---------|
| CN | 102387150 A | 3/2012  |
| CN | 102859531 A | 1/2013  |

OTHER PUBLICATIONS

M2M.World.News, One in Every Five Wearable Wireless Devices Set for Healthcare Deployment by 2017, ABIresearch® 2pp., Jun. 21, 2012.

(Continued)

*Primary Examiner* — Peter C Shaw
(74) *Attorney, Agent, or Firm* — McDermott Will & Emery LLP

(57) ABSTRACT

A secured communication network can include a server including an authentication backend, the authentication backend configured to communicate with an authentication front end of a communication device. A server applet can be associated with the authentication backend. The server applet can authenticate an access right associated with the communication device and establish a security level for the communication with the communication device based on information received from the authentication front end.

19 Claims, 5 Drawing Sheets

Related U.S. Application Data

(60) Provisional application No. 61/816,430, filed on Apr. 26, 2013.

(51) Int. Cl.
*H04W 12/06* (2009.01)
*H04L 29/08* (2006.01)

(52) U.S. Cl.
CPC ........ *H04L 67/34* (2013.01); *H04L 2463/082* (2013.01)

(58) Field of Classification Search
USPC ............................................................ 726/2
See application file for complete search history.

(56) References Cited

U.S. PATENT DOCUMENTS

| | | | |
|---|---|---|---|
| 9,350,717 B1* | 5/2016 | Siddiqui | ................ H04L 63/08 |
| 2001/0036273 A1 | 11/2001 | Yoshizawa | |
| 2002/0169874 A1 | 11/2002 | Batson et al. | |
| 2003/0014363 A1 | 1/2003 | Sethi | |
| 2004/0015958 A1 | 1/2004 | Veil et al. | |
| 2004/0111640 A1* | 6/2004 | Baum | ................ H04L 61/2015 |
| | | | 726/13 |
| 2006/0141985 A1* | 6/2006 | Patel | ...................... H04L 63/20 |
| | | | 455/410 |
| 2006/0165060 A1 | 7/2006 | Dua | |
| 2007/0190939 A1 | 8/2007 | Abel | |
| 2007/0244811 A1 | 10/2007 | Tumminaro | |
| 2007/0264974 A1 | 11/2007 | Frank et al. | |
| 2008/0032738 A1 | 2/2008 | Boyer et al. | |
| 2008/0046581 A1* | 2/2008 | Molina | .................. H04L 63/08 |
| | | | 709/229 |
| 2008/0172725 A1* | 7/2008 | Fujii | ...................... G06F 21/32 |
| | | | 726/5 |
| 2008/0271109 A1 | 10/2008 | Singh | |
| 2009/0006856 A1* | 1/2009 | Abraham | ................ G06F 21/55 |
| | | | 713/183 |
| 2009/0143104 A1 | 6/2009 | Loh et al. | |
| 2011/0191862 A1* | 8/2011 | Mandava | ............... H04W 12/08 |
| | | | 726/28 |
| 2013/0019292 A1* | 1/2013 | Varshavsky | ........... H04L 9/3231 |
| | | | 726/7 |
| 2013/0104187 A1* | 4/2013 | Weidner | .................. G06F 21/45 |
| | | | 726/1 |
| 2014/0013406 A1* | 1/2014 | Tremlet | ................... G06F 21/32 |
| | | | 726/5 |
| 2014/0082713 A1* | 3/2014 | Markel | ................... H04L 63/08 |
| | | | 726/7 |
| 2014/0189777 A1* | 7/2014 | Viswanathan | ........ H04L 63/105 |
| | | | 726/1 |
| 2014/0304808 A1* | 10/2014 | Martini | ................... G06F 21/44 |
| | | | 726/19 |
| 2015/0149827 A1* | 5/2015 | Landry | ............... G06F 11/3058 |
| | | | 714/37 |
| 2015/0312041 A1* | 10/2015 | Choi | ..................... H04L 9/3231 |
| | | | 713/175 |

OTHER PUBLICATIONS

M2M.World.News, Healthcare Reform to Boost Growth in Telehealth Market by 55 Percent in 2013, IMSresearch Excellence in Market Intelligence, 2pp., Dec. 31, 2012.

Yu-Tzu Chiu, Encryption Chip Fights Off Sneak Attacks, Processor Obscures Characteristics that Enable Side-Channel Attacks in Cloud Computing, 2pp., Mar. 18, 2013.

IntelPR, Intel Labs Tunes into a Wireless Future Where Everything that Computes is Connected, 2pp., Sep. 13, 2012.

Matthew Green, The Threat in the Cloud, pp. 86-89, IEEE, Jan./Feb. 2013.

* cited by examiner ion on a part of the application to be used, a server, a communication device and/or a network connecting the communication device to the server. Improvements in security measures for such devices can help continue to drive the widespread adoption and demand for such devices.

METHODS AND SYSTEMS FOR SECURED AUTHENTICATION OF APPLICATIONS ON A NETWORK

1. PRIORITY CLAIM

This application is a continuation of U.S. patent application Ser. No. 13/904,426, filed May 29, 2013, now issued as U.S. Pat. No. 9,282,086, which claims priority to U.S. Provisional Application No. 61/816,430, filed Apr. 26, 2013, both of which are incorporated herein by reference in their entirety.

2. TECHNICAL FIELD

This disclosure relates to securing authentication and/or providing a security level for applications executing on a communication network, including securing third-party mobile applications.

3. BACKGROUND

With the rapid advance of technology, complex electronic devices are in widespread use in virtually every context of day to day life. The electronic devices may often be quite simple, but often have hundreds or thousands of individual electronic elements that are used to implement the device. Software frequently interfaces with the electronic components, allowing a user to use all of the features of the electronic device. The applications executing on a network may need to be securely authenticated.

BRIEF DESCRIPTION OF THE DRAWINGS

The innovation may be better understood with reference to the following drawings and description. In the figures, like reference numerals can designate corresponding parts throughout the different views.

DETAILED DESCRIPTION

The discussion makes reference to methods and systems for securing on-line applications in communication environment. A device of a user can communicate with a server to watch movies, perform banking functions, make payments, purchase security sensitive items, e.g., checks, obtain e-health or hospital records, obtain university records, and obtain employment records, etc. The secure link of the device need not rely on the native encryption and security methods for a given network, e.g., L2 network encryption. Multiple security levels over heterogeneous network technologies can be supported. An end-to-end software-specific security scheme at the application level or transport L3 encryption (IPsec) need not be relied on. Authentication and/or multiple levels of security can be provided depending on a part of the application to be used, a server, a communication device and/or a network connecting the communication device to the server. Improvements in security measures for such devices can help continue to drive the widespread adoption and demand for such devices.

Figure 1:
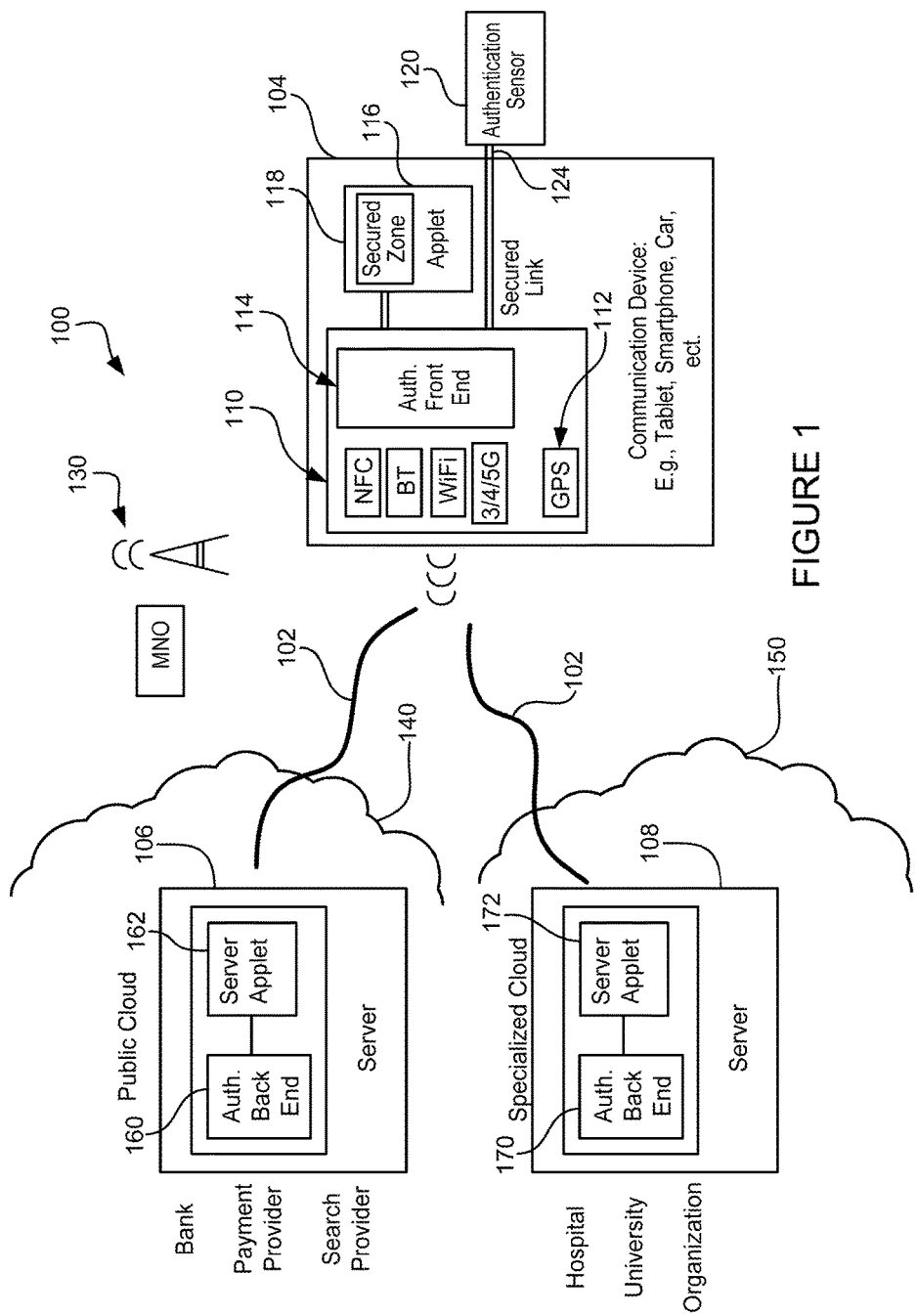
FIG. 1 is a block diagram of an exemplary secure communication environment.

FIG. 1 is a block diagram of an exemplary secure communication environment 100. Communication signals 102 can be sent between endpoints, e.g., a first communication device 104 and a first server 106, a second server 108, etc. The communication device 104 can be a mobile device such as a cell phone, personal digital assistant, tablet, portable email device, smartphone, vehicle and other mobile devices including a portable gaming system. Exemplary vehicles include automobiles, aircraft, ships and spacecraft. In some implementation, the communication device 104 can also be a non-mobile device, e.g., a desktop computer at a work station, a set-top-box at a home, etc.

The communication device 104 can include a transceiver 110 configured to transmit and receive communication messages. The messages can be sent via different protocols, e.g., near field communication (NFC), Bluetooth (BT), Wireless Fidelity (WiFi), Infrared (IR), and cellular (e.g., 3G, 4G, 5G). The communication device 104 can also include a location device, e.g., a Global Positioning Satellite (GPS) receiver 112. The transceiver configured to communicate using one or more different protocols and the location device can be implemented on a single integrated circuit or on multiple integrated circuits.

To secure messages sent and received in the communication environment 100, the communication device can also include a processor 114 connected, directly or indirectly, with a memory 116. The processor 114 can execute code, e.g., an applet stored in the memory 116, to implement an authentication front end. The memory 116 can be implemented in various ways, e.g., with a secure element, universal integrated circuit (UICC) or a secure digital (SD) memory. Additionally or alternative, the applet can be implemented using hardware or firmware, e.g., if more security is required than a software only implementation, through a secure microcontroller or other trusted platform module (TPM), trusted execution environment (TEE), hardware and software tokens, etc. In some implementations a combination of both software and hardware can be used.

The processor 114 can also connect to other elements for securing communications, including an authentication sensor or sensors 120 which can be used to collect user information, e.g., biometric information, e.g., face recognition, vein recognition, vital signs and fingerprints, and/or gestures or motion. The user information can be sent with the secured communications, and used to determine authentication and/or a security level to help prevent impersonation. Additionally or alternatively, the sensor 120 can detect environmental conditions including a location of the device of the user, whether the device is located indoors or outdoors, temperature, date, time, etc. The information from the sensors, GPS, etc. is secured by hardware and/or software to protect an integrity of the authentication parameters. For example, if position is one of the criteria, altering or tampering of the location information given by the GPS is detected the hardware and/or software and reported to the communication device 104 as being unreliable location information.

The communication environment 100 can include antennas, landlines, satellites and cellular towers 130 operated by mobile network operators (MNO) to facilitate communication between the communication device 104 and the servers 106, 108. In one example, the communication device 104 can access the first server 106 through a public cloud 140. The first server 106 can be operated by a search provider, e.g., YAHOO or GOOGLE, a payment provider, e.g., PAYPAL, a bank or other financial institution, etc. In another example, the communication device 104 can access a second server 108 through a private or specialized cloud 150. The second server 108 can be operated by various entities including a hospital, university and organizations.

To provide for backend security between the communication device 104 and the first and second servers 106, 108, the first server 106 can include a processor 160 and a memory 162 for storing a server applet, and the second server 108 can include a processor 170 and a memory 172 for storing a server applet. Additionally or alternatively, the applets can be implemented with hardware or firmware. As described in more detail below, the authentication backend processors 160, 170, server applets 162, 172, authentication front end 114, and communication device applet 116 can provide for secured communications that are network agnostic, e.g., public or private networks. Communications can also be secured regardless of the connection currently available, e.g., NFC, BT, IR, Wi-Fi, 3/4/5G, etc., including those provided by some communication devices that implement integrated, multi-network architectures. Network port communication can help prevent tampering.

Figure 2:
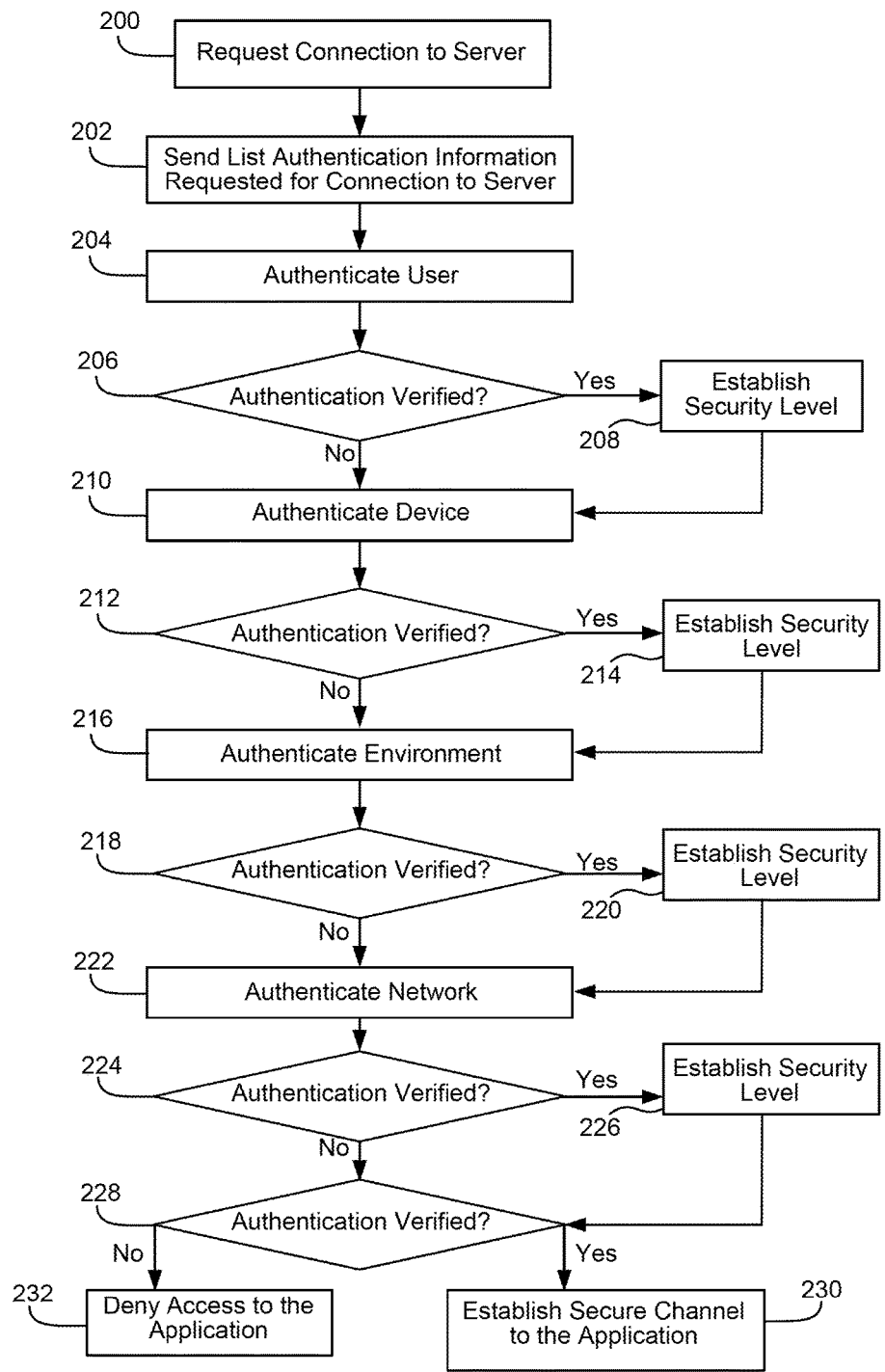
FIG. 2 is a flow chart for establishing exemplary secure communications between a communication device and a server on a network.

FIG. 2 is a flow chart for establishing exemplary secure communications between the communication device 104 and one or more servers, e.g., the first server 106 and the second server 108, on the communication network 100. The secure communication can occur with the first server 106, the second server 108 or both.

The communication device 104 can request a connection to the servers 106, 108. The servers 106, 108 can connect through a network for a given application or sub-application, e.g., the servers 106 can connect to the communication device 104 through the public cloud 140 or/and the servers 108 can connect through a specialized cloud 150 (200). For ease of explanation, a connection with the first server 106 will be described, but a connection to one or more different servers, e.g., the second server 108, can be similarly accomplished.

The server 106 can send to the communication device 104 a list of requested authentication information. The list can be sent via a communication packet by way of the MNO 130 or other communication path (202). The requested information can be used to establish a connection with the application at a determined security level available to the application. Critical functionality and key storage for authenticating the communication device 104 can be stored in hardware, and outputs, inputs and challenge questions can be stored in software in the communication device 104. The elements stored in software can be encrypted to protect the information from being stolen, e.g., the elements can be encrypted with a symmetrical 128 bit or 256 bit advanced encryption standard (AES) or with asymmetrical Rivest Shamir Adleman (RSA) authentication, Triple data encryption standard (3DES), elliptic curve cryptography (ECC), etc., and verified according to the International Organization for Standardization (ISO) 9796 and other standards.

For added security, the memory 116 can include a secure zone 118 to store the security related algorithms, e.g., to prevent hacking. The secure zone 118 can be implemented, for example, with a second operating system or second core processor of the communication device 104, which is physically and/or logically isolated from a first operating system or core processor. The authentication information can be packaged, encrypted and signed to secure the information from being viewed and tampered with by unauthorized entities before being sent to the server 106.

To establish a security level available to the application, the server 106 can authenticate the user (204). For example, the server can process authentication information sent by the communication device 104 in response to the request for information. The authentication backend 160 of the server 106 can determine if the user of the communication device 104 is a verified user based on the processed information (206). Among other information, the server 106 can process a communication user's response to a challenge question to determine if the response matches an expected response to the challenge question. Valid responses can be stored in the server applet 162, e.g., in a secured zone of the server applet 162 of the server 106. Another way that the server 106 can determine an authentication of the device includes comparing a stored biometric template to biometric information of the user sent by the communication device 104. The biometric information of the devices can be obtained from the user, for example, via the authentication sensor 120. The authentication sensor 120 can send the biometric information to a network port of the communication device 104 by way of the secured link 121. If authentication of the user is verified, the server 106 can establish a security level for execution of the application on the communication device 104 (208).

Additionally or alternatively, the authentication back end 160 can authenticate the communication device 104 (210). The communication device 104 can store device verification information in hardware and/or software. If the authentication is not verified, the server 106 can deny access of its system and applications to the communication device 104 (212). If the authentication is verified, the server 106 can establish a security level for the device, e.g., independent of any application specific security (214). A security level of access to the device can be determined based on whether the communication device 104 includes a hardware secure element, e.g., higher security level, software security, e.g., a lower security level, or both, etc.

Additionally or alternatively, the authentication back end 160 can authenticate an environment (216). The environment information can be used to verify authentication of the communication device (218). For example, if the communication device 104 sends information that it is currently located in China when it should be located in the U.S., authentication may be denied. If authentication of the environment is verified, a security level can be established based on the information (220). As one example, if the device is operating a content sharing program like WEBEX, a screen capture feature can be disabled to obtain a higher level of security than if the screen capture feature was on. If the device is used to purchase items on AMAZON while the user is riding on a train, the AMAZON application may not allow access to as high a secure level of features than if the device was located at home. In another example, the server 108 of a company may not allow access to determined documents if the communication device 104 is located outside of the office, or if the user of the communication device 104 is attempting to view documents outside of business hours.

Additionally or alternatively, the authentication back end 160 can authenticate the network (222). Factors can be considered when establishing the physical secure channel, e.g., a policy of the public cloud 140 or the specialized cloud 150 in the case of the server 108. Based on information about the communication device 104 and the network, network authentication can be verified (224). If authentication is verified, the security level can be established (226). In one example, a pacemaker communication device of the user sends heart rate information to a medical provider for data processing and monitoring over a secured network. A physical secure channel can be established according to the security level of the communication device 104.

Based on the above authentications for example, the server 106 can determine if the requested authentication and security levels have been verified (228). For example, an identity of the user of the device, a type of application requested to be accessed at the server 106, a location of the device, a time of day of the access, and a security level of the communication device 104, etc. can be used to determine authentication, a security level or both authentication and a security level. Depending on the authentication and security level the application may access the server a determined amount. Based on the authentication and security level, the communication network 100 can establish a secure channel to the communication device 104 by way of the application (230). If the requested authentication and security level is not verified, the server 106 can deny access to the communication device 104 for the application (232).

Figure 3:
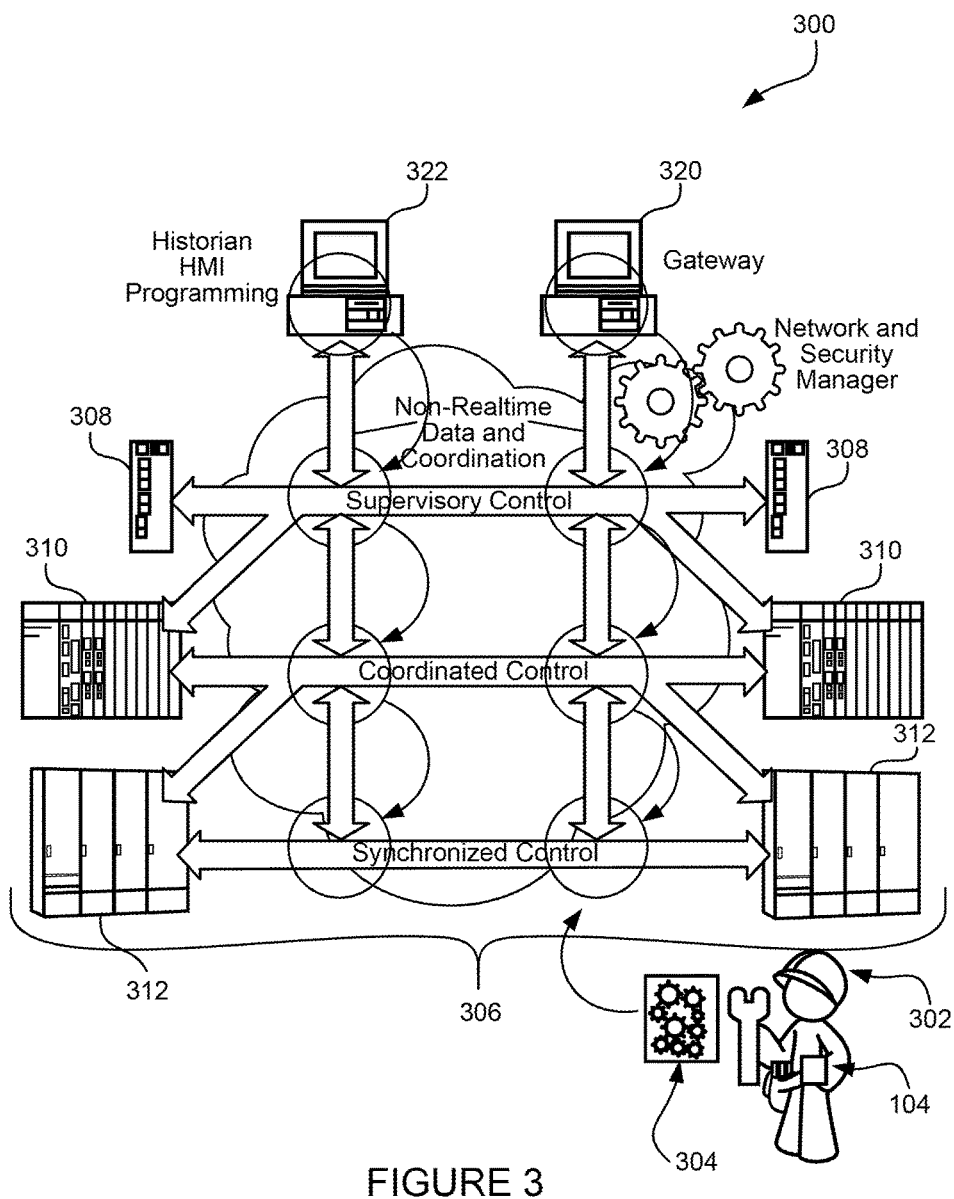
FIG. 3 is a block diagram of an exemplary communication environment for determining a security level of access available to the communication device.

FIG. 3 is a block diagram of an exemplary communication environment 300 for determining a security level of access available to the communication device 104. For example, the user 302 can utilize the communication device 104 to aid them in working on a machine 304. The communication device 104 connects, wirelessly or through wires, directly or indirectly, with server 306 to obtain secured information about the machinery 304. The server 306 can include a converged network on the plant floor, including supervisory control units 308, coordinated control units 310 and synchronized control units 312.

To determine a security level provided to the communication device 104, a location of the communication device 104 can be compared to a location of machinery 304 that the authenticated user is working on. For example, a location of a worker at a nuclear power plant is compared to a location of machinery being worked on when the server 306 is providing information about the machinery, e.g., a maintenance guide. If the communication device 104 is near the machinery, the server 106 can provide a higher level of secure information to the communication device 104 than if the communication device 104 was not near the machinery. For example, whether the server 306 provides access to the supervisory control layer 308 or the synchronized control layer 312 can depend on a security level established for the authenticated user 302 on the authenticated communication device 104 by the location of the communication device 104 to the machinery 304, and/or other factors, e.g., time of day. This provides a vertical access function of the level of security between the gateway computer 320 and the applications of protocols of units 308, 310, 312, and the historian human machine interface (HMI) programming computer 322 and the application and protocols of units 308, 310, 312.

The GPS 112 and/or 3/4/5G 110 can be used to supply location information to the communication device 104 for sending to the server 306 to be used to determine a location of the communication device 104 and compare the location of the communication device 104 to a determined location of the machinery 304. A location of the machinery can be stored, for example, with the server 306, or determined, e.g. by the server 306 communicating with the machinery 304. To allow access to the more secure applications, or the content of documents provided by the application, the communication device 104 may need to be physically located within a determined distance of the machinery, e.g., be located next to the machinery. If the communication device 104 is away from the machinery the server 306 may not provide the guide.

Figure 4:
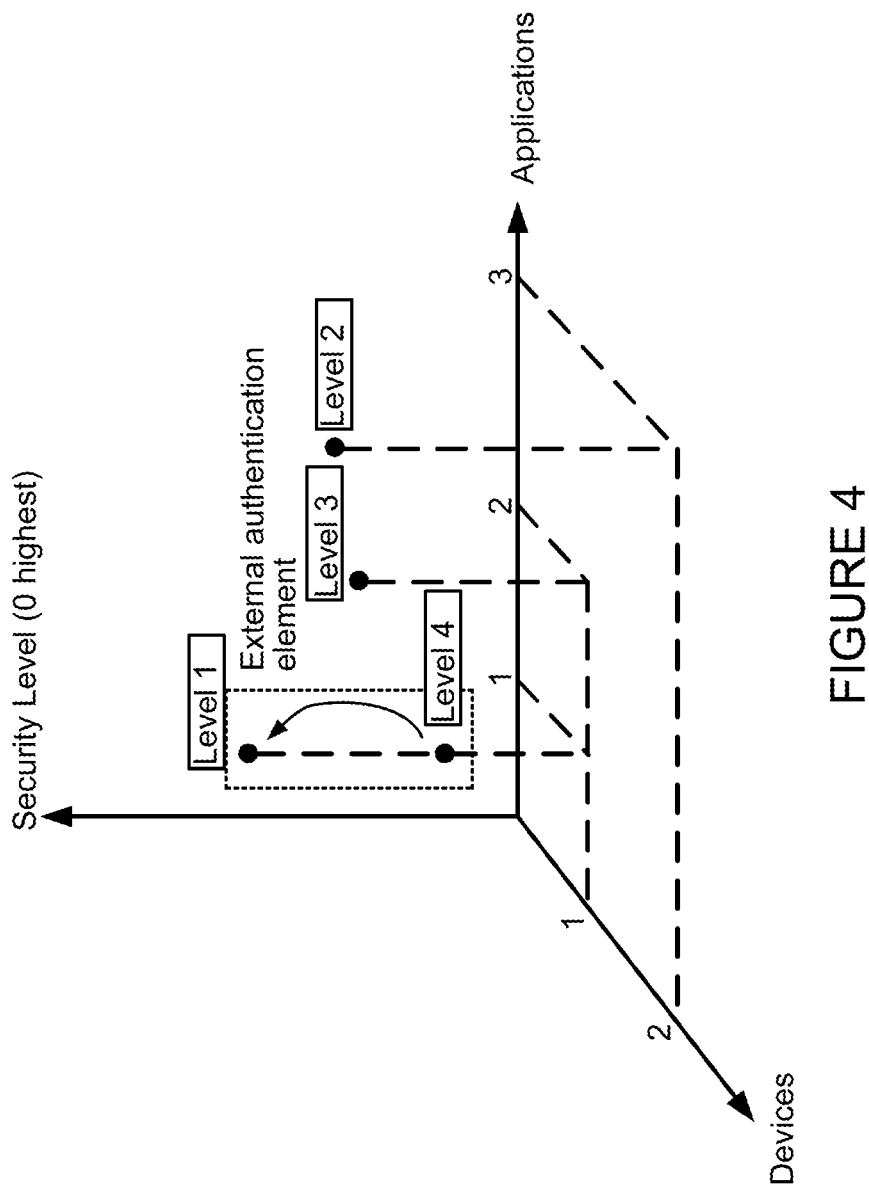
FIG. 4 is a diagram of an exemplary multi-dimensional, single security module.

FIG. 4 is a diagram of an exemplary multi-dimensional, single security module. The single security module can operate on multiple devices (e.g., devices 1, 2) over various applications (e.g., applications 1, 2, 3) for multiple security levels (e.g., levels 0, 1, 2, 3, 4). In view of the single security module approach, one or more databases that contain huge amounts of credentials to address every application and every device separately are not needed.

In one example, for device 1, application 1, an application security level can move from a lower level 4 to a higher level 1, e.g., based on external authentication elements, e.g., provided by the communication device 104 or the user. For example, the user may have provided biometric information to the communication device 104 to obtain the higher security level with the application. Or the communication device 104 may have been moved physically closer to the office or machinery that the user is working on.

For the same device 1, the communication device 104 can, separately or concurrently to the level 1 access of application 1, have level 3 access to application 2. Therefore, the same communication device 104 of the same user can provide different levels of access to different applications. The level of security can be based on various factors, e.g., a location of the communication device 104, a time of day, an identification of the communication device 104, the type of security in the communication device 104 that the user is utilizing, etc.

For a different communication device 104, such as one that includes hardware security, the security level may be higher. Additionally or alternatively, if the communication device 104 is using 3/4/5G to communicate, instead of BT, the security level may change. Also, for a different device 2 accessing an application 3, the security level may be determined at level 2 under the present circumstances including any of the factors described herein, or other factors. In this way, the security module can provide various devices different security levels of access over various applications. User privacy and private information can be maintained in an open/cloud environment, secured and flexible payment methods can be provided, and e-health services in hospitals and private access to medical records can be accomplished, without the need for separate, closed applications for each type of activity.

Figure 5:
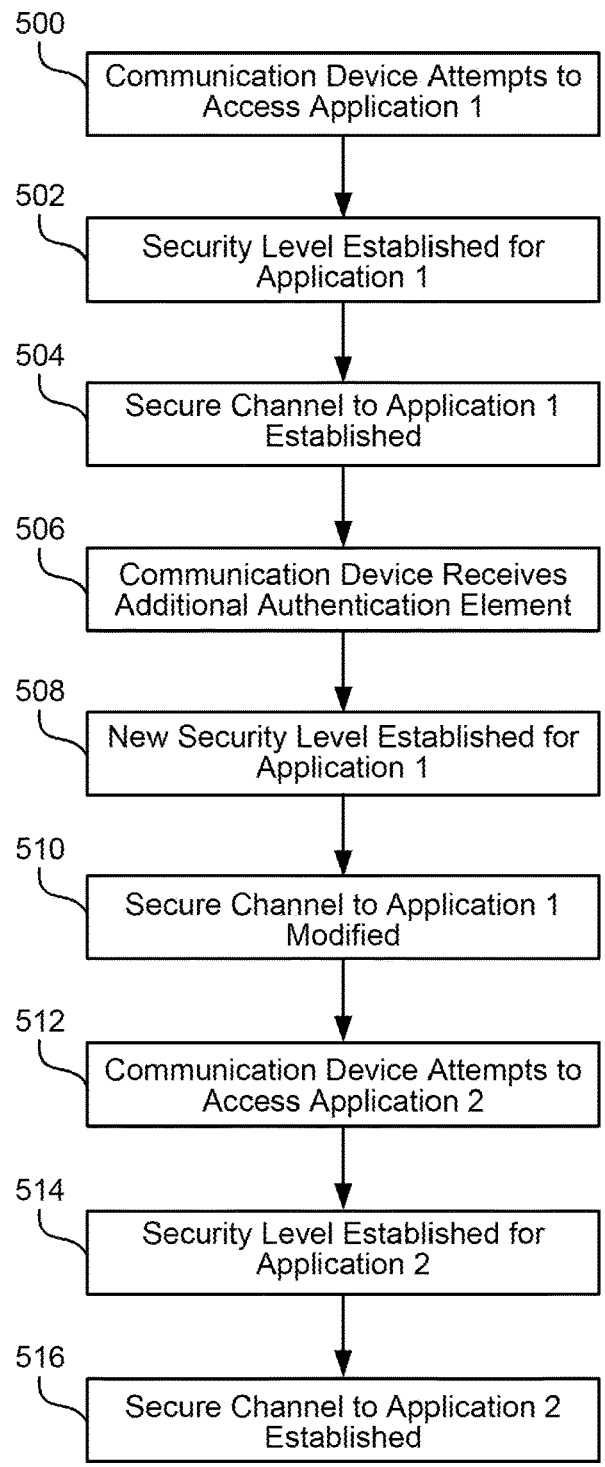
FIG. 5 is a flowchart example of establishing secure communication of applications executing on the communication device.

FIG. 5 is a flowchart example of establishing secure communication of applications executing on the communication device 104. The communication device 104 accesses application 1, e.g., of FIG. 4 (500). The communication device 104 may execute application 1 in response to a user clicking an icon on the user the communication device 104. For example, application 1 may provide a connection to a server at the user's place of work e.g., the first server 106 or the second server 108, on the communication network 100. In this example, Application 1 is an open application that the user purchased through an app store. Application 1 can be saved on the communication device 104, saved on a network, e.g., the cloud, or partially saved on both the communication device 104 and the network. The user is a passenger in a vehicle on the way to work and the communication device is currently located a determined distance from work, e.g., 5 miles.

A low security level is initially established for Application 1 (502). A low security level can be established based on information from the communication device 104, e.g., a location of the communication device 104 and an identity of the user, etc. A policy of the server being accessed by the communication device 104 via Application 1 can state that for this particular user located a determined distance from work, security level 4 is appropriate. A secure channel between the server and Application 1 may also be established based on the security level (504).

When the communication device 104 receives additional authentication information, the security level can be changed, e.g., raised or lowered (506). In one example, when the communication device arrives within a determined distance from work, e.g., 500 feet, a new security level is established for Application 1. For example, for this user at work a security level of 1 can be determined, providing the application the highest level of access to the work server and/or the highest level of access to the application. The communication environment can establish a modified secure channel between Application 1 and the work server.

While Application 1 is connected to work, the user of the communication device 104 may open Application 2, e.g., a third-party application from which the user can access her bank (512). Alternatively, a first party application may be used. In one scenario, it is 9:00 AM local time for the bank and the communication device 104 on a weekday, and the user decides not to provide a thumb print to the communication device 104. Based on this information, and possibly other information, Application 2 is granted a determined level of access to the bank (514). If level 3 access is granted, for example, the communication environment establishes a secure channel based on the level 3 security level (516). At level 3 the application may access general information from the bank, but specific account information is not accessible, for example. Therefore, the communication environment can provide multiple applications, various security levels for the same or different communication devices.

The methods, devices, techniques, and logic described above may be implemented in many different ways in many different combinations of hardware, software or firmware or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits interconnected through trusted links. All or part of the logic described above may be implemented as instructions for execution by a processor, controller, or other processing device and may be stored in a tangible or non-transitory machine-readable or computer-readable medium such as flash memory (FLASH), random access memory (RAM) or read only memory (ROM), programmable read only memory (PROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various embodiments have been described, many more embodiments and implementations are possible. Accordingly, the description is not to be restricted.

What is claimed is:

1. A method comprising:
    establishing a security level for a communication device with a server computer based on authentication of the communication device over a network, the security level being independent of an application separately executable on the communication device, wherein establishing the security level for the communication device comprises determining, by the server computer, a presence of either a hardware secure element or a software secure element at the communication device;
    authenticating a user of the communication device with the server computer using a secured communication over the network, the secure communication established in accordance with the security level, wherein authentication of the user is separate from the authentication of the communication device;
    establishing, by the server computer, a first application specific security level for the application being executed on the communication device based on the authentication of the user and the established security level of the communication device;
    allowing, by the server computer, the communication device to access the server computer a first determined amount based on the first application specific security level;
    receiving at the server computer from the communication device, an authentication element comprising information corresponding to an environmental condition, integrity of the authentication element confirmed by the communication device prior to transmission to the server computer;
    dynamically increasing, by the server computer, a security level of the application from the first application specific security level to a second application specific security level based upon receipt over the network by the server computer of the authentication element from the communication device, the authentication of the user and the established security level of the communication device; and
    allowing, by the server computer, the communication device to access the server computer at a second determined amount, the second determined amount being a higher level of access than the first determined amount.

2. The method of claim 1, wherein the authentication element is a first authentication element, and the method further comprise increasing, by the server computer, the security level from the second application specific security level to a third application specific security level based upon receipt over the network of a second authentication element.

3. The method of claim 2, wherein the first authentication element received over the network by the server computer includes biometric information of the user of the communication device, and the second authentication element received over the network by the server computer includes an indication of an environment in which the communication device is currently operated.

4. The method of claim 1, wherein establishing the security level for the communication device comprises the server computer authenticating the network.

5. The method of claim 1, wherein the authentication element includes biometric information of the user of the communication device and a current location of the communication device.

6. The method of claim 1, further comprising receiving by the server computer any of a plurality of different authentication elements, and changing, by the server computer, the security level of the application to different respective application specific security levels in accordance with the received any of the plurality of different authentication elements.

7. The method of claim 1, wherein the application is a first application and the method further comprises:
  establishing, by the server computer, a third application specific security level for a second application executed on the communication device, the third application specific security level established based on the authentication of the user and the established security level of the communication device; and
  changing, by the server computer, a security level of the second application from the third application specific security level to a fourth application specific security level based upon receipt over the network of another authentication element from the communication device;
  wherein the first application and the second application are different applications, and the third and fourth application specific security levels of the second application are independent and different than the first and second application specific security levels of the first application.

8. A secured communication network, comprising:
  a server computer configured to receive from a network a connection request from a communication device;
  the server computer configured to authenticate the communication device with device verification information received over the network from the communication device;
  the server computer configured to determine a presence of a hardware secure element or a software secure element at the communication device and establish a security level for the communication device based on the presence of the hardware secure element or the software secure element, the security level for the communication device being independent of an application that is separately executable on the communication device;
  the server computer configured to authenticate a user of the communication device with user information received over the network via secure communications established in accordance with the security level established for the communication device;
  the server computer configured to establish and provide, to the communication device, a security level for the application executed on the communication device, the security level of the application being an application specific security level for execution of the application on the communication device, and being established based on the security level of the communication device and the authentication of the user; and
  the server computer configured to dynamically change the security level of the application to an elevated application specific security level in response to receipt over the network of an authentication element from the communication device.

9. The secured communication network of claim 8, wherein the authentication element includes biometric information of the user of the communication device, the biometric information used by the server computer to further authenticate the user of the communication device.

10. The secured communication network of claim 8, wherein the authentication element includes environment information of the communication device, the elevated security level being set differently in dependence on the environment information.

11. The secured communication network of claim 8, wherein the server computer is configured to provide secure information to the application upon establishment of the application specific security level, and only provide a predetermined higher level of secure information to the application in response to the security level of the application being changed to the elevated application specific security level.

12. The secured communication network of claim 8, wherein the authentication element is provided by one of the user of the communication device, or automatically by the communication device itself.

13. The secured communication network of claim 8, wherein the application is one of a plurality of applications separately executable on the communication device by a user of the communication device, and the server computer is configured to independently establish a security level and independently change the security level to a corresponding elevated application specific security level for each of the plurality of applications in response to receipt of the authentication element.

14. The secured communication network of claim 13, wherein different security levels are established at the corresponding elevated application specific security level of each of the plurality of applications.

15. The secured communication network of claim 8, wherein the application is a first application and the server computer is further configured to establish a security level of a second application executed on the communication device, the security level of the second application being an application specific security level for execution of the second application on the communication device, and being established based on the security level of the communication device and the authentication of the user, the security level of the second application being changed to a higher security level by the server computer in response to receipt over the network of another authentication element from the communication device.

16. A communication device, comprising:
  a processor;
  a network port;
  an authentication front end executable by the processor to provide a secured connection with a network through the network port; and
  the authentication front end executable by the processor capable to communicate over the network via the network port an indication that the communication device comprises a hardware secure element when the communication device comprises the hardware secure element, and an indication that the communication device comprises a software secure element when the communication device comprises the software secure element, to establish a security level for the communication device with a network server computer based on a presence of either the hardware secure element or the software secure element at the communication device;

the authentication front end further executable by the processor to transmit, via the network port, over the secure connection to the network server computer, authentication information to authenticate a user of the communication device and establish an application specific security level for an application executable by the processor to obtain secure information from the network server computer;

the authentication front end further executable by the processor to confirm an integrity of an authentication element comprising information corresponding to environmental information; and the authentication front end further executable by the processor to, after having confirmed the integrity of the authentication element, transmit, via the network port, over the secure connection to the network server computer the authentication element to dynamically raise the application specific security level to a new elevated application specific security level so that the application is executable by the processor to obtain additional secure information that is unavailable to the application at the application specific security level.

17. The communication device of claim 16, wherein the communication device further comprises an authentication sensor configured to capture and provide biometric information of the user of the communication device, and the authentication element includes the captured biometric information.

18. The communication device of claim 17, wherein the authentication sensor is further configured to capture and provide the environment information in which the communication device is operable.

19. The communication device of claim 18, wherein the environment information is operational information of the communication device.

* * * * *